United States Patent [19]

Russell

[11] Patent Number: 4,976,366

[45] Date of Patent: Dec. 11, 1990

[54] UNDERGROUND VALVE BOX

[76] Inventor: Jim L. Russell, 5018 S. Irvington Ave., Tulsa, Okla. 74135

[21] Appl. No.: 463,160

[22] Filed: Jan. 10, 1990

[51] Int. Cl.⁵ ............................................. F16L 59/16
[52] U.S. Cl. ................................ 220/4 B; 220/85 P; 220/18; 137/375; 138/148
[58] Field of Search ................. 138/148, 149, DIG. 6; 137/375, 377, 382; 285/47, 120, 398; 220/85 P, 18, 4 F, 4 B

[56] References Cited

U.S. PATENT DOCUMENTS

| | | | |
|---|---|---|---|
| 3,367,358 | 2/1968 | Rentschler | 137/375 |
| 3,392,867 | 7/1968 | Morris | 220/18 |
| 3,425,456 | 2/1969 | Schibig | 137/375 |
| 3,556,158 | 1/1971 | Schneider | 138/149 |
| 3,575,214 | 4/1971 | Bindel | 138/149 |
| 4,162,740 | 7/1979 | Jones | 220/18 |
| 4,301,828 | 11/1981 | Martin | 220/85 P |
| 4,429,721 | 2/1984 | Davis | 138/149 |
| 4,449,554 | 5/1984 | Busse | 138/149 |
| 4,716,926 | 1/1988 | Jacobs | 137/375 |
| 4,872,575 | 10/1989 | Kobilan | 220/18 |

Primary Examiner—Stephen Marcus
Assistant Examiner—S. Castellano
Attorney, Agent, or Firm—Head & Johnson

[57] ABSTRACT

An underground valve box for encapsulating a service valve selected from a variety of valves having vertical or horizontal cylindrical bodies with horizontal inlet and outlet lines disposed linearly through the body consists of an upright with a horizontal member defining upper and lower portions therein, a plurality of concentric steps descending downwardly and inwardly from the horizontal member into the lower portion of the base, a pair of V-shaped seats diametrically disposed in the member, a pair of diametrically oposed topwardly accessible notches in the upper portion of the base aligned with the V-shaped seats and a horizontal external lip and a body with lower and upper vertical concentric barrels integrally connected by an inwardly and upwardly tapering intermediate segment. The lower barrel has a pair of diametrically opposed bottomwardly accessible notches and a plurality of horizontal ribs on its interior surface and the intermediate segment is tapered to restrictively receive the body of the selected valve. Each of the concentric steps has a diameter and depth coordinated to restrictively receive the body of at least one of the variety of vertical body valves when the inlet and outlet lines of the selected valve are disposed in the topwardly accessible notches of the base. The lip of the base and the ribs of the body are cooperable to releasably interlock the base with the body with the inlet and outlet lines of the selected valve disposed in the aligned notches.

17 Claims, 4 Drawing Sheets

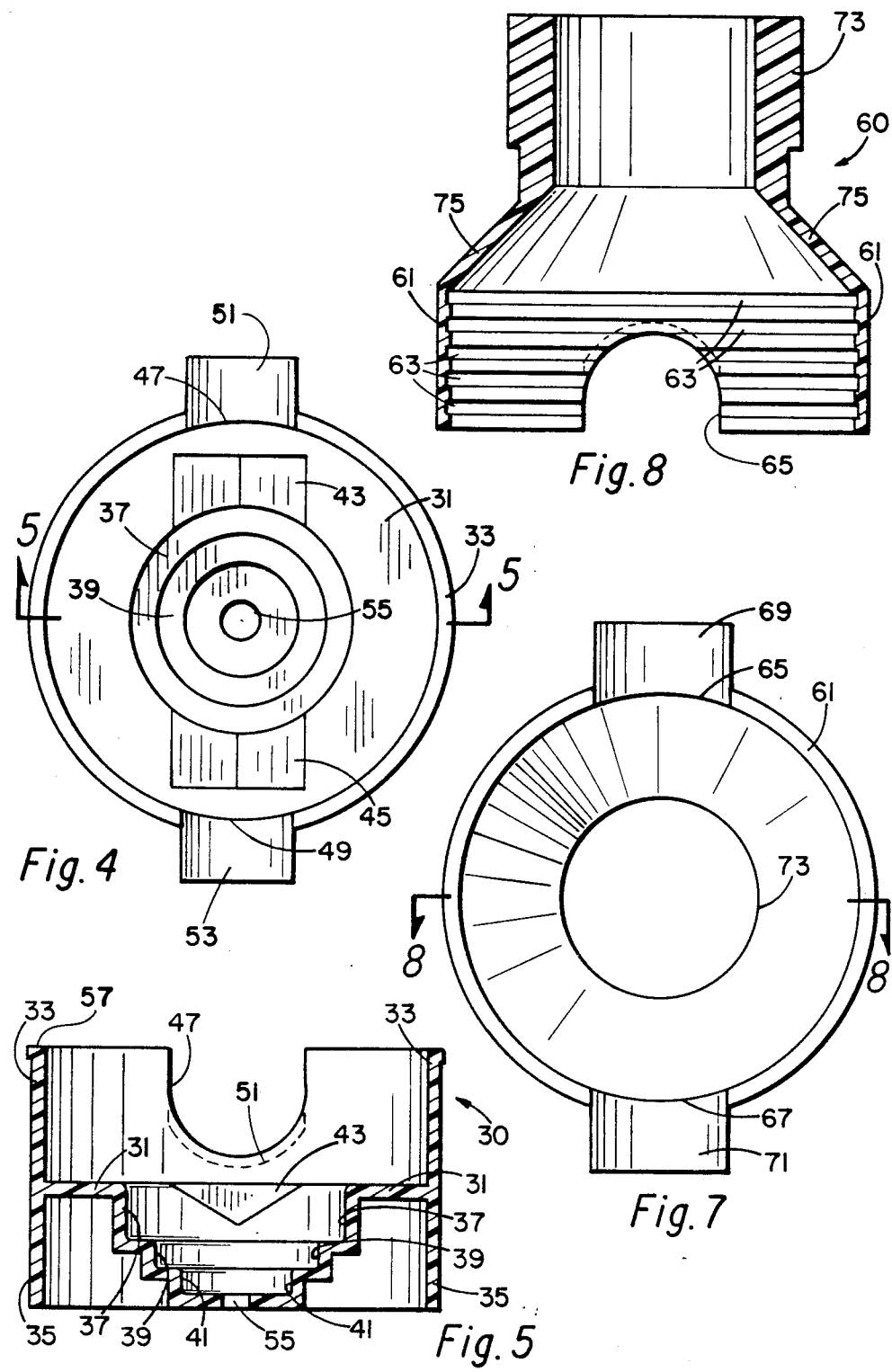

4,976,366

UNDERGROUND VALVE BOX

BACKGROUND OF THE INVENTION

The present invention relates to underground distribution systems and more particularly concerns valve boxes for use with underground water, gas, electric, telephone and sewer lines.

Modern underground distribution systems employ valves, boxes and lines made of plastic to avoid the effects of corrosion which plague older metal systems. However, innovative improvements often result in new problems. Lightweight plastics are not able to withstand some of the external forces that their earlier metal counterparts were able to absorb. Furthermore, the structural variations made possible by the use of plastics have resulted in a wide range of exterior valve dimensions.

Consequently, valve boxes designed to suit one particular valve can significantly compromise the structural interrelationship of the valve, the box and the lines when used with a different valve so as to create weak points in the system which will eventually result in system failure. On the other hand, in terms of both space and economics, it is highly undesirable to have to stock as wide a range of boxes as valves. Clearly, then, there is a need for a universal valve box which minimally compromises the structural strengths of the valve, box and line assembly. No such universal valve box is presently available.

It is, therefore, an object of the invention to provide a valve box which will work effectively with a variety of valve structures. Similarly, it is an object of the invention to provide a valve box structurally coordinated with a variety of valves and lines so as to effectively distribute the forces exerted upon these underground distribution members. Another object of this invention is to provide a valve box which is easy to install and easy to access after installation. A further object of this invention is to provide a valve box that prevents rotation of the valve within the box after installation.

SUMMARY OF THE INVENTION

In accordance with the invention an underground valve box is provided which will effectively encapsulate a service valve selected from a variety of valves having bodies with horizontal inlet and outlet lines extending linearly through the body. The box includes a tubular base divided into upper and lower portions by a horizontal member. Concentric steps descend downwardly and inwardly from the horizontal member into the lower portion of the base forming a series of seats, decreasing in diameter and increasing in depth, one of which will accommodate the selected valve body. The upper portion of the base has a pair of topwardly accessible diametrically opposed notches in which the inlet and outlet lines of the valve will be disposed when the valve body is inserted in its appropriate seat. The valve box also includes a tubular body which has a pair of bottomwardly accessible notches which can be aligned with the topwardly accessible notches of the tubular base. The tubular body is configured to securely removably gird the upper portion of the tubular base with the inlet and outlet lines of the valve disposed in the bottomwardly accessible notches. Preferably, the tubular body is contoured to also restrictively receive the body of the valve so as to minimize the possibility of rotation of the valve within the box.

BRIEF DESCRIPTION OF THE DRAWINGS

Other objects and advantages of the invention will become apparent upon reading the following detailed description and upon reference to the drawings in which:

FIG. 4 is a plan view of the base of FIG. 3;

FIG. 5 is a cross-sectional view taken along the lines 5—5 of FIG. 4;

FIG. 7 is a plan view of the body of FIG. 6;

FIG. 8 is a cross-sectional view taken along lines 8—8 of FIG. 7;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
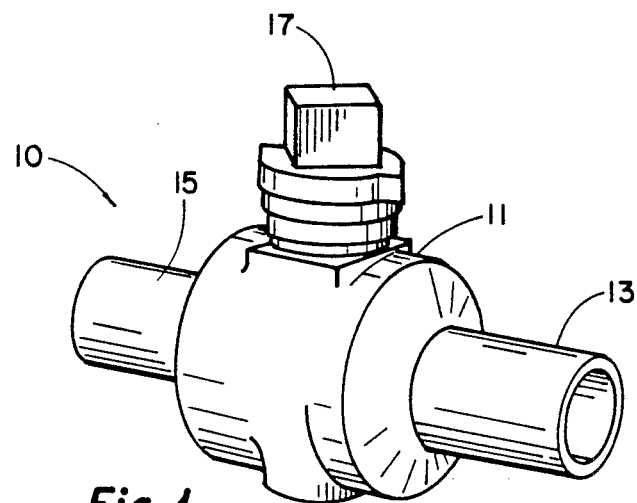
FIG. 1 is a perspective view of a typical all plastic valve with a horizontal cylindrical body.
Figure 2:
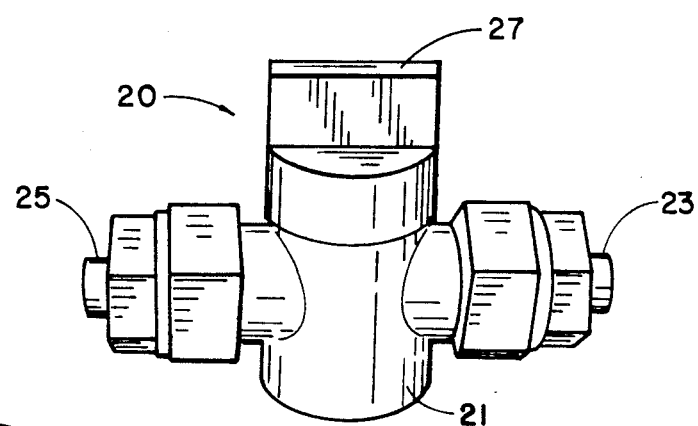
FIG. 2 is a perspective view of a typical all plastic valve having a vertical cylindrical body.

Typical modern plastic valves 10 and 20 are illustrated in FIGS. 1 and 2. In FIG. 1, the valve 10 is characterized by a horizontal cylindrical body 11 with incoming and outlet lines 13 and 15, respectively, extending on a linear and horizontal axis through the valve body 11. The internal valve mechanism (not shown) is operated by the rotation of the valve head 17. In FIG. 2, the valve 20 consists of a vertical cylindrical body 21 with incoming and outgoing lines 23 and 25, respectively, extending on a linear and horizontal axis through the valve body 21. The valve mechanism (not shown) is operated by the rotation of the valve head 27. The valves 10 and 20 shown are typical of a wide variety of these two basic valves resulting from variations in the axial length and diameter of the valve body 11 or 21, variations in the diameter of the incoming and outgoing lines 13 or 23 and 15 or 25 and variations of the configuration of the valve head 17 or 27.

Figure 3:
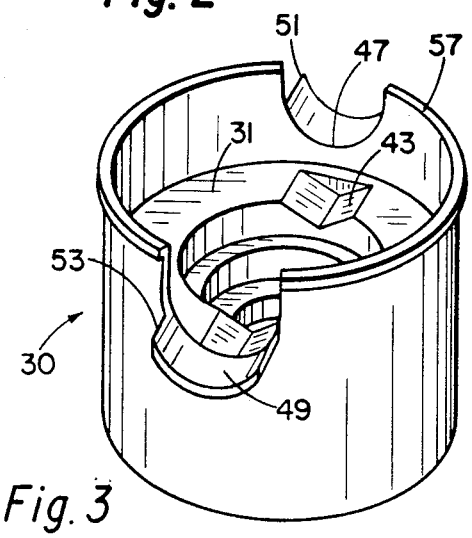
FIG. 3 is a perspective view of the base of a preferred embodiment of the valve box.

Turning to FIGS. 3, 4 and 5, the base 30 of a universal valve box for encapsulating any of this wide variety of valve configurations is illustrated. The base 30 is tubular and preferably, but not necessarily, cylindrical as shown. It is divided by a horizontal member 31 to define upper and lower portions 33 and 35, respectively. The horizontal member 31 includes a sequence of concentric steps 37, 39 and 41 which descend downwardly and inwardly into the lower portion 35 of the base 30. The uppermost level of the horizontal member 31 also includes diametrically opposed V-shaped seats 43 and 45 which extend from the first step 37 toward the cylindrical wall of the base 30. The base angle of the V-shaped seats will be between ninety and one hundred thirty-five degrees and preferably approximately one hundred twenty degrees to snugly receive a typical hex connector. The upper portion 33 of the base 30 also has a pair of diametrically opposed topwardly accessible notches 47 and 49 which are aligned vertically with the V-shaped seats 43 and 45. The notches 47 and 49 have preferably semi-circular bottoms as shown and may optionally include cradle portions 51 and 53 extending radially outwardly from the body 30. Preferably the notches 47 and 49 are sized to accommodate a 2" O.D. pipe or hex connector. The lowermost portion of the horizontal member 31 may also include an aperture 55 to facilitate drainage of undesirable substances from the valve base 30. The depth of each of the steps 37, 39 and 41 is coordinated with its respective concentric diameter to accommodate a wide variety of valves having vertical cylindrical bodies as illustrated in FIG. 2. The number of concentric steps may also be varied. Similarly, the length, depth and angle of the V-shaped seats 43 and 45 is established to accommodate a wide variety of valves having horizontal cylindrical bodies as illustrated in FIG. 1, as well as comparatively narrow valves with hex connectors mounted within the base 30. One or more of the concentric steps may be adapted as a knockout to permit accommodation of longer vertical body valves. The base 30 may also have an outer peripheral lip 57 along its upper edge for purposes hereinafter explained.

Figure 6:
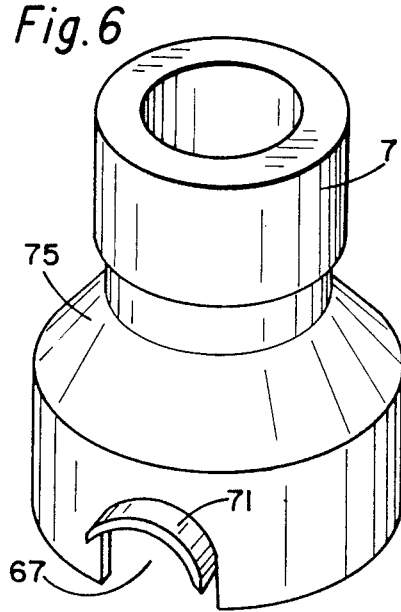
FIG. 6 is a perspective view of the body of a preferred embodiment of the valve box.

Turning now to FIGS. 6, 7 and 8, the body 60 of the valve box is illustrated. The body 60 is a tubular member configured to securely, removably gird the upper portion 33 of the base 30. As shown for use with the cylindrical base 30 hereinbefore described, the body will have a cylindrical lower barrel 61 having an inner diameter substantially equal to the outer diameter of the cylindrical base 30. Ribs 63 may also be provided on the interior surface of the lower barrel which will cooperate with the lip 57 of the base 30 to provide a releasable interlock between the base 30 and the body 60. Alternatively, the ribs could be formed on the outer surface of the base 30 and the lip provided on the interior lower periphery of the barrel 61. A pair of diametrically opposed bottomwardly accessible notches 65 and 67 are provided in the lower barrel 62. The notches 65 and 67 are alignable with the base notches 47 and 49, have a semi-circular upper portion and may include outwardly extending saddles 69 and 71. The body 60 may also include an upper barrel 73 of diameter less than that of the lower barrel 61, the barrels 61 and 73 being integrally connected by an inwardly and upwardly tapering intermediate segment 75 between the two. The upper barrel 73 will be configured for snug disposition within the cylindrical housing which will extend from the valve box body 60 upwardly to the ground level (not shown). The height of the lower barrel 61 and the height and slope of the intermediate segment 75 may also be coordinated for reasons hereinafter set forth.

Figure 9:
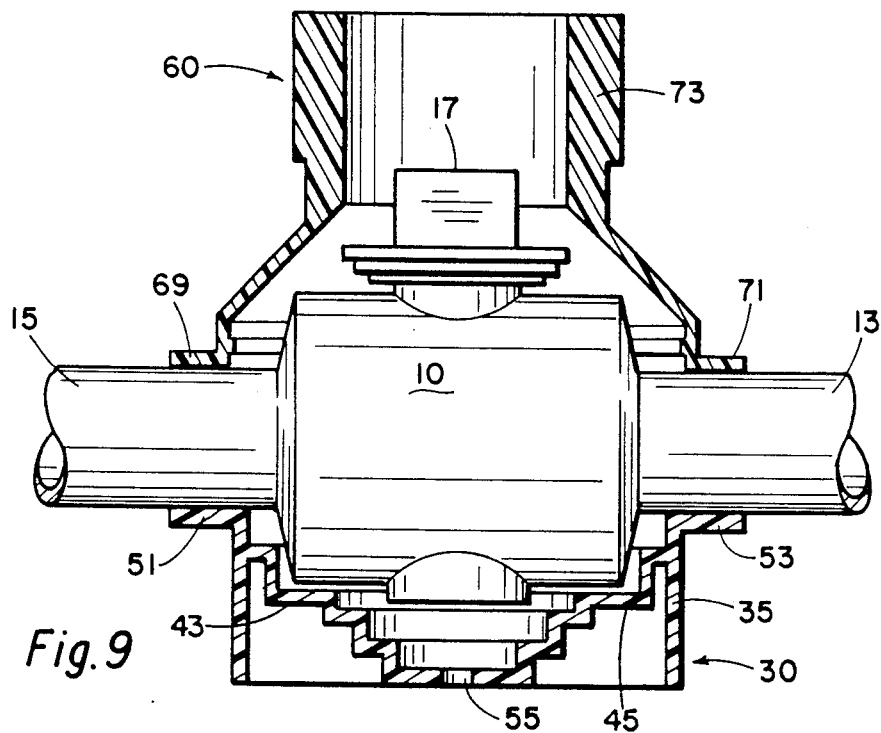
FIG. 9 is a partial cross-sectional view of a valve box assembly illustrating a valve such as that of FIG. 1 mounted in the valve box of FIGS. 3 and 6.
Figure 10:
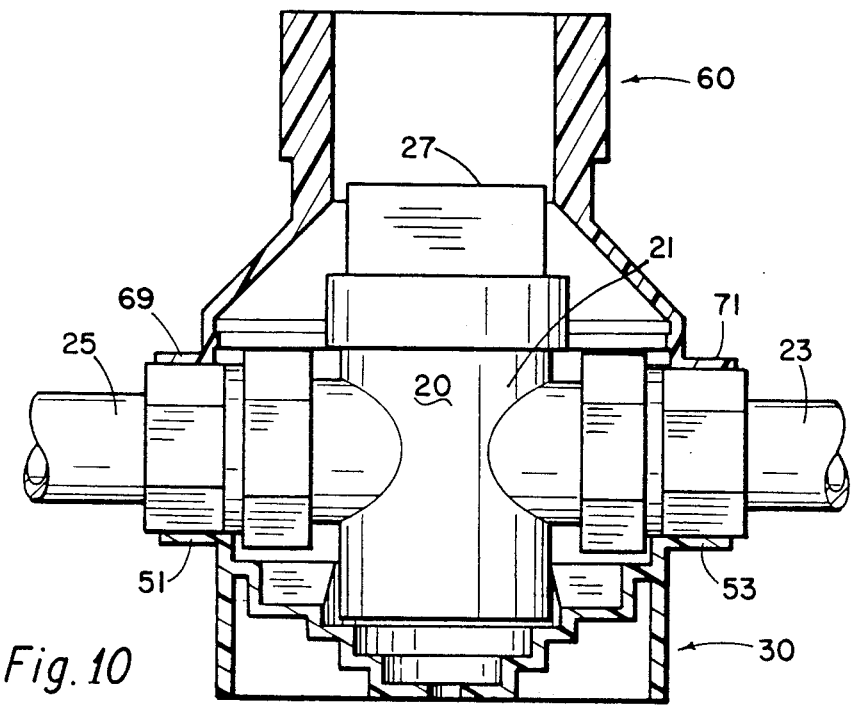
FIG. 10 is a partial cross-sectional view of a valve box assembly illustrating a valve such as that of FIG. 2 mounted in the valve box of FIGS. 3 and 6.

FIGS. 9 through 12 illustrate the mounting of various typical horizontal and vertical body valves within the valve box. As shown in FIG. 9, a horizontal body valve such as that shown in FIG. 1 is mounted with its body section 11 partly disposed within the V-shaped seats 43 and 45. The depth of the topwardly accessible notches 47 and 49 is established so that with the valve body 11 resting within or on the V-shaped seats 43 and 45, the inlet and outlet lines 13 and 15 extend through the diametrically opposed notches 47 and 49. The inlet and outlet lines 13 and 15 are preferably cradled in the cradles 51 and 53 but may be spaced from the cradles 51 and 53 if the valve body 11 rests on the seats 43 and 45. The valve body 60 is removably securely set over the base 30 with the bottomwardly accessible notches 65 and 67 aligned to slide over the inlet and outlet lines 13 and 15. The saddles 69 and 71 cooperate with the cradles 51 and 53 to partially circle or grasp the inlet and outlet lines 13 and 15. The body 60 is downwardly pressed onto the base 30 until the upper portions of the notches 65 and 67 come into contact with the inlet lines 13 and 15. As shown in FIG. 10, a vertical body valve such as that shown in FIG. 2 is mounted in the base 30 by setting the cylindrical valve body 21 within the appropriate concentric step of the base 30. The valve 20 can be inserted into the cylindrical upper portion 33 of the base 30 until the inlet and outlet lines 23 and 25 or their connectors come into contact with the lower portions of the topwardly accessible notches 47 and 49. The bottom of the cylindrical valve body 21 will thus be seated within but not necessarily in contact with the horizontal surface of the appropriate concentric step. The length of the upper portion 33 of the base 30 and the depth of the notches 47 and 49 are coordinated to this purpose. The cradles 51 and 53 and the saddles 69 and 71, when employed, function similarly to the manner described in relation to FIG. 9. With the valve assembly disposed on the base 30, the body 60 is securely and removably pressed onto the base 30 until the upper portion of the notches 65 and 67 contact the inlet and outlet lines 23 and 25 or their connectors.

Figure 11:
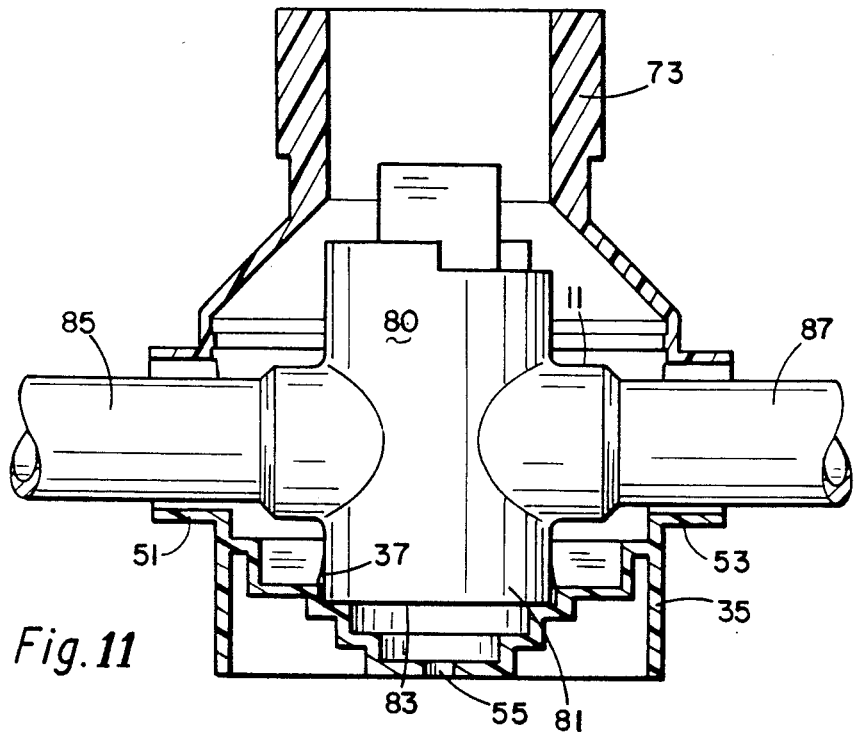
FIG. 11 is a partial cross-sectional view of a valve box assembly illustrating another type of vertical body valve mounted in the valve box of FIGS. 3 and 6.

FIG. 11 illustrates another type of vertical body valve 80 mounted on the base 30 by inserting the cylindrical valve body 81 into the appropriate concentric step of the base 30 until the bottom 83 of the valve body 81 is firmly seated on the horizontal portion of the concentric step. In this condition, the inlet and outlet lines 85 and 87 may be seated in contact with the cradles 51 and 53 but more likely will be spaced slightly above the cradles 51 and 53 as shown.

Figure 12:
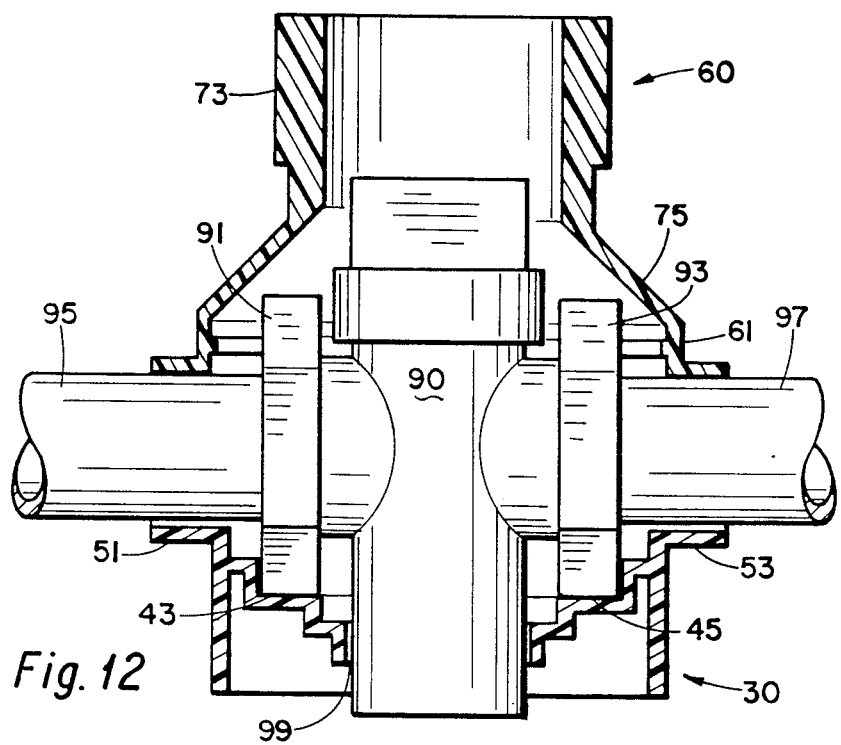
FIG. 12 is a partial cross-sectional view of a valve box assembly illustrating another type of valve mounted in the valve box of FIGS. 3 and 6.

Another type of valve 90 is illustrated in FIG. 12 to emphasize the mounting arrangement in which the hex connectors 91 and 93 associated with inlet and outlet lines 95 and 97 are firmly seated in the V-shaped seats 43 and 45 of the base 30. Thus, the inlet and outlet lines 95 and 97 may, but do not necessarily, come into contact with the cradles 51 and 53. This illustration also emphasizes the use of a knock-out 99 feature provided in the base 30. If the valve is seated in the V-shaped seats 43 and 45 as is here illustrated, or if some cases in which the height of a valve having a vertical cylindrical body is too great to be accommodated by the depth of the base 30, one or more of the concentric steps in the base 30 will be adapted as a knock-out 99 to permit the body of the valve 90 to extend through the base 30.

As previously noted, the height of the lower barrel 61 and the height and slope of the intermediate section 75 of the body 60 may be coordinated so that the upper portion of the valve including the head will be restrictively located within the intermediate segment 75. This insures the proper alignment of the head with the upper barrel portion 73 so that proper access to the head can always be had through the tubular housing which extends from the top of the body 60 to the surface level (not shown). This restrictive encasement also insures that the valve will not be rotated to any appreciable extent about the axis of the inlet and outlet lines through external forces on the mounted valve system.

It should be noted that in applications related to vertical cylindrical body valves as illustrated in FIGS. 10 through 12, the concentric step receiving the body of the valve also performs the above described restrictive function. The same is true of those applications in which hex connectors are firmly seated in the V-shaped seats 43 and 45.

The cradles 51 and 53 and saddles 69 and 71 serve to distribute forces exerted on the valve box over a greater area rather than to permit such forces to be focused on a concentrated location on the inlet or outlet lines, which could result in damage to the system.

The outer walls of the base 30 and the body 60 need not necessarily be cylindrical.

While the invention has been described in conjunction with a specific embodiment thereof, it is evident that many alternatives, modifications and variations will be apparent to those skilled in the art in light of the foregoing description.

Accordingly, it is intended to embrace all such alternatives, modifications and variations as fall within the spirit of the appended claims.

What is claimed is:

1. A box for encapsulating a service valve selected from a variety of valves having bodies with horizontal inlet and outlet lines disposed linearly therethrough comprising:
   a tubular base having a horizontal member defining upper and lower portions thereof, said horizontal member having a plurality of concentric steps descending downwardly and inwardly therefrom into the lower portion of said base, said upper portion having a pair of topwardly accessible notches diametrically opposed in relation to said concentric steps; and
   a tubular body having a pair of bottomwardly accessible notches alignable with said topwardly accessible notches;
   each of said concentric steps having its diameter and depth coordinated to restrictively receive the body of at least one of the variety of valves therein with the inlet and outlet lines of the selected valve disposed in said topwardly accessible notches; and
   said tubular body being configured to securely removably gird said upper portion of said base with the inlet and outlet lines of the selected valve disposed in said bottomwardly accessible notches.

2. A box according to claim 1, said tubular body being contoured to restrictively receive the body of the selected valve therein.

3. A box according to claims 1, said tubular body having means for releasably interlocking said base and said body.

4. A box according to claims 1, 2 or 3 further comprising a pair of V-shaped seats diametrically disposed in said horizontal member and aligned with said topwardly accessible notches.

5. A box for encapsulating a service valve selected from a variety of valves having vertical or horizontal cylindrical bodies with horizontal inlet and outlet lines disposed linearly therethrough comprising:
   an upright cylindrical base having a horizontal member defining upper and lower portions thereof, said horizontal member having a plurality of concentric steps descending downwardly and inwardly therefrom into the lower portion of said base, said upper portion having a pair of diametrically opposed topwardly accessible notches therein; and
   a body having lower and upper vertical concentric barrels integrally connected by an inwardly and upwardly tapering intermediate segment therebetween, said lower barrel having a pair of diametrically opposed bottomwardly accessible notches therein;
   each of said concentric steps having its diameter and depth coordinated to restrictively receive the body of at least one the variety of vertical body valves therein with the inlet and outlet lines of the selected valve disposed in said topwardly accessible notches, and
   said lower barrel having a diameter adapted to securely removably gird said upper portion of said base with the inlet and outlet lines of the selected valve disposed in said bottomwardly accessible notches.

6. A box according to claim 5, said intermediate segment having a taper angled to restrictively receive the body of the selected valve therein.

7. A box according to claims 5, said lower barrel having a horizontally ribbed interior surface and said base having a horizontal external lip along the upper portion thereof cooperable with said ribbed surface to releasably interlock said base and said body.

8. A box according to claims 5, 6 or 7 further comprising saddle means extending outwardly from each of said bottomwardly accessible notches for distributing forces exerted between said body and the valve lines and cradle means extending outwardly from each of said topwardly accessible notches for distributing forces exerted between said base and the valve lines.

9. A box according to claims 5, 6 or 7 further comprising a pair of V-shaped seats diametrically disposed in said horizontal member and aligned with said topwardly accessible notches.

10. A box for encapsulating a service valve selected from a variety of valves having vertical or horizontal cylindrical bodies with horizontal inlet and outlet lines disposed linearly therethrough comprising:
   an upright cylindrical base having a horizontal member defining upper and lower portions thereof, said horizontal member having a plurality of concentric steps descending downwardly and inwardly therefrom into the lower portion of said base and a pair of V-shaped seats diametrically disposed therein, said upper portion having a pair of diametrically opposed topwardly accessible notches therein aligned with said V-shaped seats and a horizontal external lip; and
   a body having lower and upper vertical concentric barrels integrally connected by an inwardly and upwardly tapering intermediate segment therebetween, said lower barrel having a pair of diametrically opposed bottomwardly accessible notches therein and a plurality of horizontal ribs on the interior surface and said intermediate segment having a taper angled to restrictively receive the body of the selected valve therein;
   each of said concentric steps having its diameter and depth coordinated to restrictively receive the body of at least one of the variety of vertical body valves therein with the inlet and outlet lines of the selected valve disposed in said topwardly accessible notches, and said lip and said ribs being cooperable to releasably interlock said base with said body with the inlet and outlet lines of the selected valve disposed in said notches.

11. A box according to claim 10, at least one of said concentric steps being adapted as a knock-out from said base.

12. A box according to claims 10 or 11 further comprising saddle means extending outwardly from each of said bottomwardly accessible notches for distributing forces exerted between said body and the valve lines and cradle means extending outwardly from each of said topwardly accessible notches for distributing forces exerted between said base and the valve lines.

13. A box according to claim 2, said tubular body having means for releasably interlocking said base and said body.

14. A box according to claim 13 further comprising a pair of V-shaped seats diametrically disposed in said horizontal member and aligned with said topwardly accessible notches.

15. A box according to claim 6, said lower barrel having a horizontally ribbed interior surface and said base having a horizontal external lip along the upper portion thereof cooperable with said ribbed surface to releasably interlock said base and said body.

16. A box according to claim 15 further comprising saddle means extending outwardly from each of said bottomwardly accessible notches for distributing forces exerted between said body and the valve lines and cradle means extending outwardly from each of said topwardly accessible notches for distributing forces exerted between said base and the valve lines.

17. A box according to claim 15 further comprising a pair of V-shaped seats diametrically disposed in said horizontal member and aligned with said topwardly accessible notches.

* * * * *